United States Patent [19]

Stair et al.

[11] Patent Number: 5,381,138
[45] Date of Patent: Jan. 10, 1995

[54] INTELLIGENT OVER-THE-AIR PROGRAMMING

[75] Inventors: Mark T. Stair, Delray Beach; Edward L. Ehmke, Wellington, both of Fla.

[73] Assignee: Motorola, Inc., Schaumburg, Ill.

[21] Appl. No.: 191,744

[22] Filed: Feb. 4, 1994

Related U.S. Application Data

[63] Continuation of Ser. No. 786,156, Oct. 31, 1991, abandoned.

[51] Int. Cl.6 .............................................. H04Q 7/00
[52] U.S. Cl. ........................... 340/825.44; 340/825.47; 340/825.48; 340/311.1
[58] Field of Search ..................... 340/825.44, 825.47, 340/825.48, 311.1

[56] References Cited

U.S. PATENT DOCUMENTS

| | | | |
|---|---|---|---|
| 4,839,628 | 6/1989 | Davis et al. ..................... | 340/825.44 |
| 4,845,491 | 7/1989 | Fascenda et al. . | |
| 4,868,561 | 9/1989 | Davis .............................. | 340/825.48 |
| 4,910,510 | 3/1990 | Davis et al. . | |
| 5,012,234 | 4/1991 | Dulaney et al. ................ | 340/825.44 |
| 5,049,874 | 9/1991 | Ishida et al. . | |
| 5,182,553 | 1/1993 | Kung .............................. | 340/825.44 |
| 5,247,519 | 9/1993 | Snowden et al. .............. | 340/825.44 |

Primary Examiner—Donald J. Yusko
Assistant Examiner—Edward Merz
Attorney, Agent, or Firm—Gregg Rasor

[57] ABSTRACT

A selective call receiver includes receiver circuitry (20) and decoder circuitry (32). The receiver circuitry (20) receives selective call signals, including reprogramming messages (100). The decoder circuitry (32) decodes the reprogramming messages (100) and produces data in response thereto. The data includes program information (110) and reprogramming data (112). A reprogrammable memory device (70) stores option information for control of various operational features of the selective call receiver. A processor (34) is coupled to the decoder circuitry (32) and the reprogrammable memory device (70) and reprograms the option information in response to the reprogramming data (112) and according to the program information (110).

13 Claims, 7 Drawing Sheets

INTELLIGENT OVER-THE-AIR PROGRAMMING

This is a continuation of application Ser. No. 786,156, filed Oct. 31, 1991 and now abandoned.

FIELD OF THE INVENTION

This invention relates in general to selective call receivers for receiving radio frequency (RF) modulated signals, and in particular to selective call receivers having features reprogrammable over-the-air.

BACKGROUND OF THE INVENTION

Selective call receivers have various features which allow individuality in operation of the receiver. For example, features such as reminder chirps and low battery alerts can have the frequency of alert or type of alert programmable. Options for these features are programmed into a nonvolatile memory of the receiver and can be activated by the user or service provider. It is beneficial to have a variety of service provider activatable options to render the selective call service marketable with other services and to allow individuality in service provided while maintaining control over the receiver operation centrally with the service provider.

Service providers can reprogram these features via over-the-air programming. Over-the-air programming of selective call receiver options, though, have been limited to writing over the programmed option with the received reprogramming information. Some options, however, are necessarily incompatible with other options and overwriting can lead to ineffective and sometimes contradictory selective call receiver operation.

Thus, what is needed is a selective call receiver which can be intelligently reprogrammed over-the-air.

SUMMARY OF THE INVENTION

In carrying out the above and other objects of the invention in one form, there is provided a selective call receiver comprising a receiving means for receiving selective call signals comprising reprogramming messages and a reprogrammable memory means for storing option information. A decoding means is coupled to the receiving means for decoding the reprogramming messages to produce data comprising program information and reprogramming data, and a control means is coupled to the decoding means and the memory means for reprogramming the option information in response to the reprogramming data and according to the program information.

DESCRIPTION OF THE PREFERRED EMBODIMENT

Figure 1:
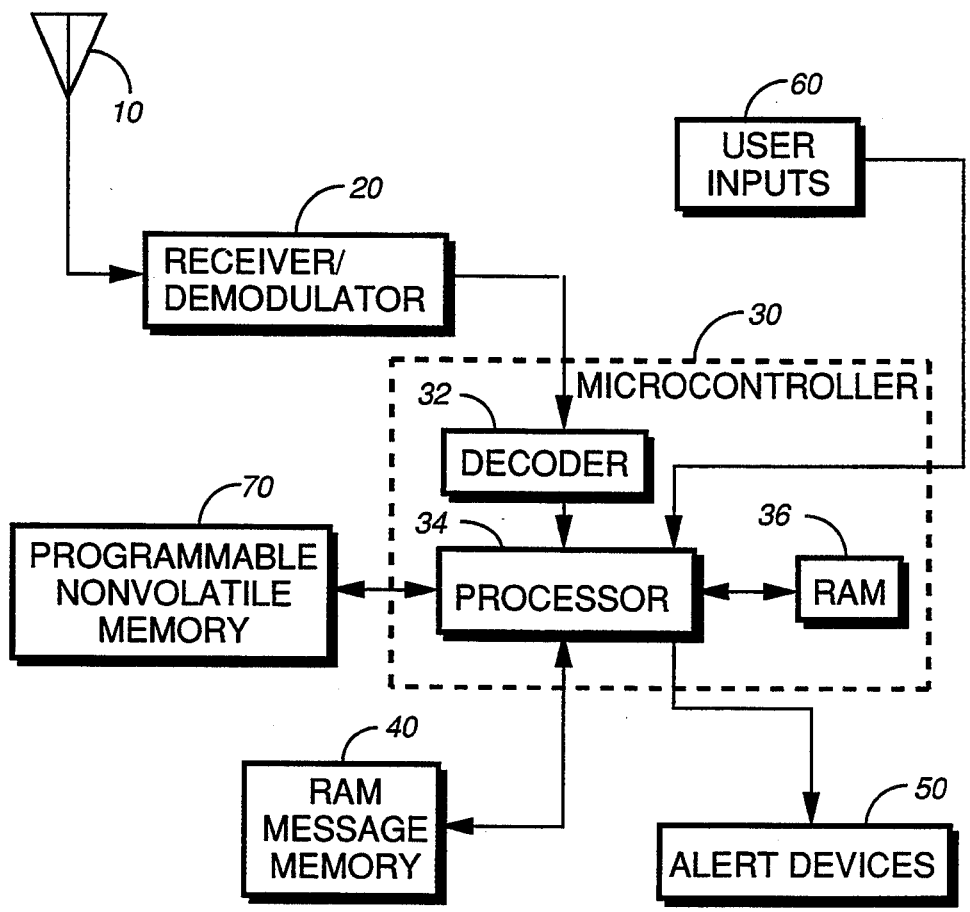
FIG. 1 is a block diagram of a selective call receiver according to the present invention.

A selective call receiver operating in accordance with the present invention is depicted in FIG. 1. An antenna 10 receives selective call signals and provides those signals to a receiver and demodulator circuit 20. The resultant signal is provided to a microcontroller 30 as a digital signal. The microcontroller 30 comprises a decoder 32, a processor 34, and an internal RAM 36. The digital signal is decoded by the decoder 32 and then processed by the processor 34. The processor 34 reads from or writes to the internal random access memory 36.

In addition, a memory storage area for selective call messages is provided by message random access memory 40. During operation, the processor 34 can provide alerts to the user via alert devices 50. Additionally, the processor 34 can receive inputs from the user via user input circuitry 60.

A non-volatile memory 70 is coupled to the processor 34 for storage of information necessary for the operation of the selective call receiver. The memory 70 can be an electrically erasable programmable read only memory (EEPROM), a battery backed-up memory device, or similar memory device which retains information even when power is not applied to the selective call receiver. The processor 34 accesses information such as selective call addresses and options for various features from the non-volatile memory 70 during selective call receiver operation. In addition, the processor 34 can alter the information in the non-volatile memory 70 by reprogramming in accordance with the present invention as described below.

Figure 2:
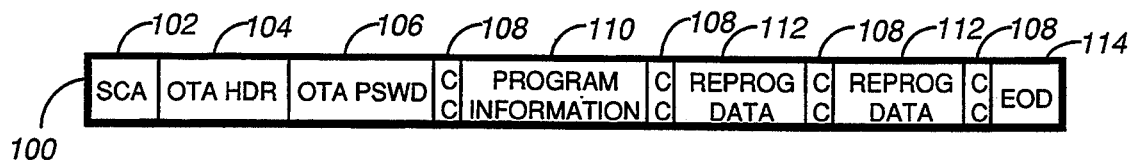
FIG. 2 is a diagram of an over-the-air reprogramming protocol according to the present invention.

The selective call receiver can receive selective call messages in any of a plurality of manners known to those skilled in the art. In addition, the selective call receiver of the present information may receive reprogramming messages in accordance with the present invention. The form of the reprogramming messages are depicted in FIG. 2. The reprogramming message 100 comprises a selective call address 102 for addressing the selective call receiver to be reprogrammed. Next, an over-the-air header (OTA HDR) 104 is received. The OTA HDR indicates to the receiver that the information following is an over-the-air reprogramming message. Following the OTA HDR 104 is the over-the-air password 106. The over-the-air password 106 is optional and allows the selective call receiver to verify the authority for reprogramming before reprogramming can take place in response to the reprogramming message 100. A command code (CC) 108 follows the over-the-air password 106 and is used to separate information within the reprogramming message. Following the first command code 108, program information 110 is received by the selective call receiver. The program information 110 is essentially a program which can be run by the processor 34 during reprogramming of the non-volatile memory 70 (FIG. 1). A second command code (CC) 108 follows the program information 110 after which reprogramming data 312 is received. The reprogramming data 112 is data used to reprogram the non-volatile memory 70 in accordance with the program information loaded and run by the processor 34 (FIG. 1).

Multiple blocks of reprogramming data 112 separated by command codes 108 each comprise new option data for reprogramming a corresponding feature having options stored in a portion of the option information within the non-volatile memory 70 (FIG. 1). After reception of the multiple block of reprogramming data 112, an end of data (EOD) symbol 114 is received indicating the end of the reprogramming message 100.

Alternatively, the program information 110 in conjunction with the reprogramming data 112 could be used to reprogram other portions of the selective call receiver or other functions performed by the selective call receiver. For example, the program information 110 and the reprogramming data 112 could be used to restructure the message memory 40 (FIG. 1), such as deleting older messages, creating a file in the memory 40, or concatenating multiple messages into a file. Furthermore, some selective call receivers have other functions, such as the watch functions of the Wrist Watch Pager manufactured by Motorola, Inc. of Schaumburg, Ill. The program information 110 and the reprogramming data 112 could be used to set the time and/or the alarms of the watch.

Figure 3A:
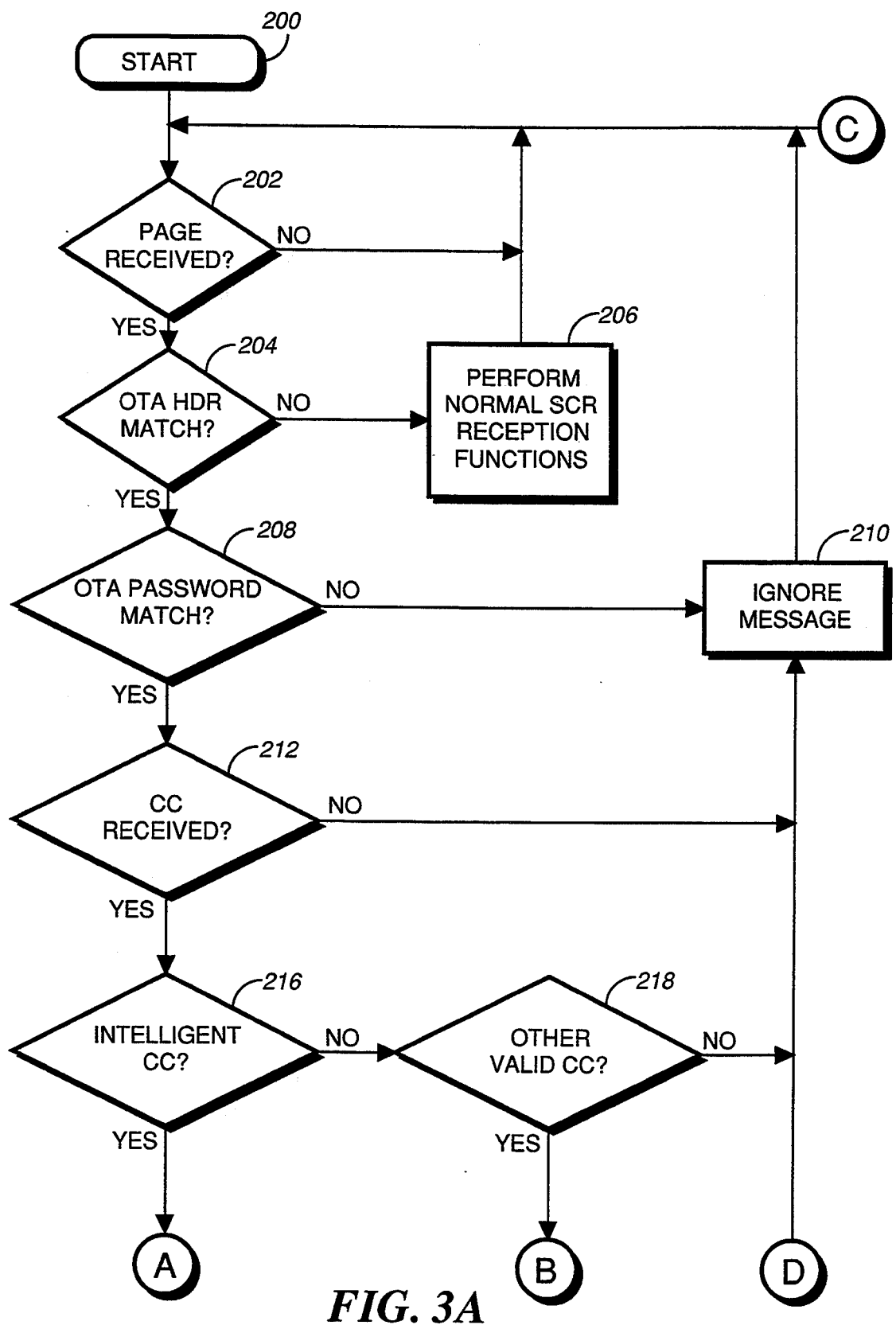
FIGS. 3A and 3B are a flowchart of the operation of the microcontroller of the selective call receiver in accordance with the present invention.
Figure 3B:
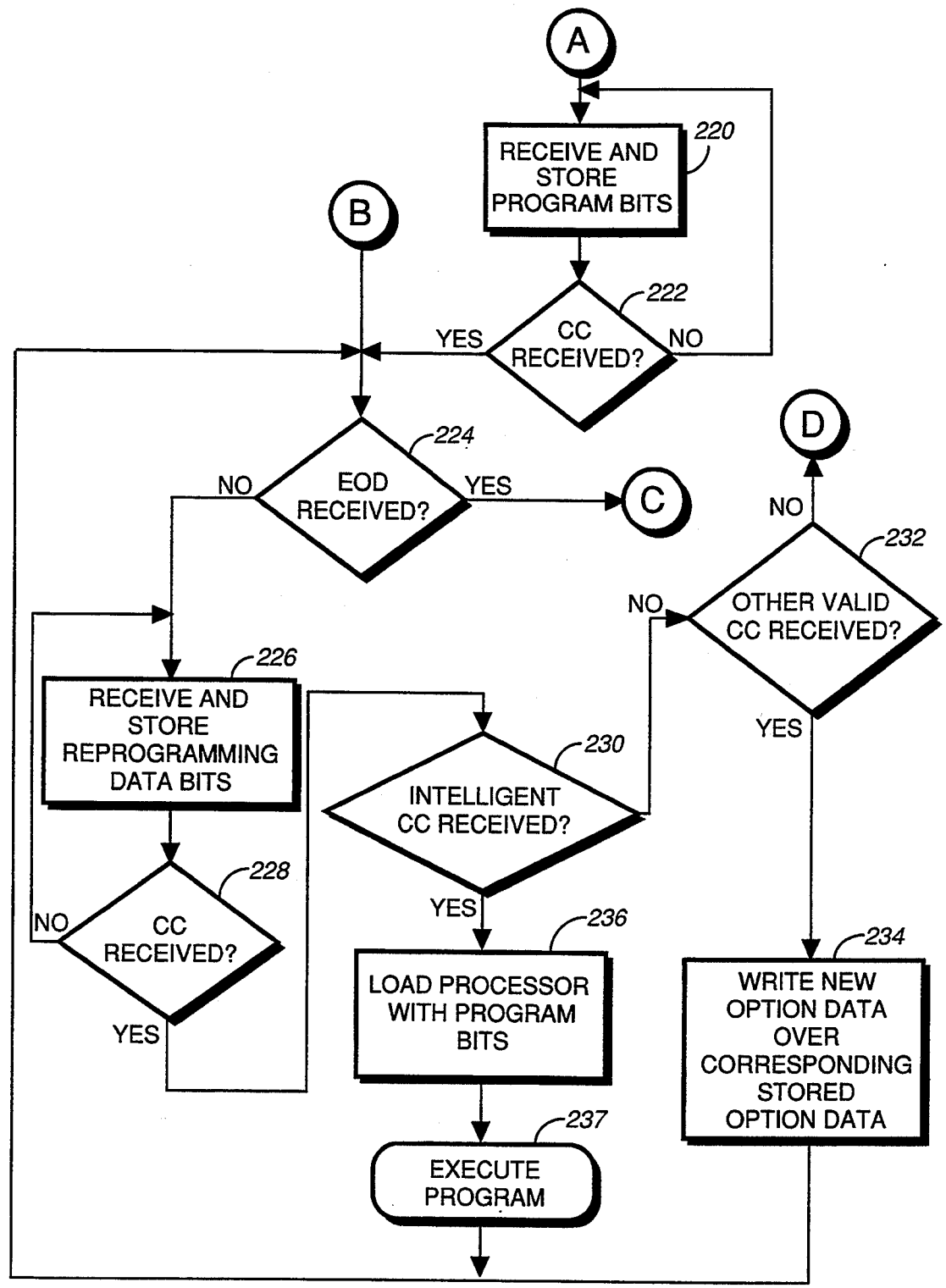

A flowchart of the operation of the processor 34 (FIG. 1) in accordance with the present invention is depicted in FIGS. 3A and 3B. Once the pager is energized 200, the processor 34 processes the input from the decoder 32 (FIG. 1) to determine whether a page has been received 202 (i.e., whether a selective call address matching the selective call address of the selective call receiver has been received). If a page has not been received 202, operation remains in an idle loop until a page is received. When a page is received 202, processing determines whether the page is a valid over-the-air reprogramming page 204. If the page is not an over-the-air reprogramming page 204, then normal pager reception functions 206 well known to those skilled in the art are performed and processing returns to the idle loop 202 to await reception of the next page.

If a valid over-the-air header is found 204 in the signal, processing begins searching for a match to the over-the-air password 208. The use of an over-the-air password allows for reprogramming only by signals originating from authorized persons. If a valid over-the-air password is not found 208, the message is ignored 210 and processing returns to the idle loop to await the next page received 202.

If a valid over-the-air password is received 208, the next information received is examined to see if a predetermined command code (CC) is received 212. If the command code is not received 212, the message is ignored 210 and processing returns to await the next page received 202.

The command code 108 (FIG. 2) informs the processor whether intelligent over-the-air programming is to be performed or other reprogramming is to be performed. Therefore, multiple command codes are acceptable to the processor and determine how the following information received will be handled. If the command code (CC) is determined to be the intelligent command code 216 (FIG. 3A) processing will take one path. If the CC is determined to be another valid CC 218, processing will take a second path. If the CC is determined not to be a valid CC 216, 218, the message is ignored 210 and processing returns to await the next page received 202.

If the programming message is an intelligent over-the-air programming message as indicated by the command code 216, program information 110 (FIG. 2) is next received 220 as a plurality of program bits. The program bits are received and stored 220 until the next command code is received 222.

When a command code is received 222, the intelligent over-the-air programming branch rejoins processing and an end-of-data (EOD) code is searched for 224. When the EOD code is received 224, processing is complete and operation returns to await the next page received 202. If the EOD code is not received 224, reprogramming data bits are next received 226. Until the next command code is received 228, the reprogramming data bits which are received are stored 226. When the command code (CC) is received 228, it is determined whether the command code is an intelligent command code 230 or another valid command code 232. If the command code is neither an intelligent command code 230 or a valid command code 232, processing will ignore the message 210 and return to the idle loop to await the next page received 202.

If the command code is not an intelligent command code 230 but a valid command code 232, the stored reprogramming data bits (i.e., new option data) are written over corresponding stored option data 234 in the programmable nonvolatile memory 70 (FIG. 1). The information received is next examined to determine if the EOD code is received 224. If the EOD code is received 224, processing then returns to the idle loop to await the next page received 202. If the EOD code is not received 224, processing continues as described herein for additional reprogramming data bits 226.

According to the present invention, if the command code is an intelligent command code 230, intelligent over-the-air programming proceeds by loading the processor with the programming information in the form of program bits which have been received and stored 236. The processor then executes the program 237 thereby reprogramming the option information in the nonvolatile memory 70 (FIG. 1) in response to the reprogramming data bits received and stored 226 and in accordance with the programming information loaded into the processor 236. After the program is executed 237, processing examines the next information received 224. If the EOD code is received 224, processing then returns to the idle loop to await the next page received 202. If the EOD code is not received 224, processing continues as described herein for additional reprogramming data bits 226.

Figure 4:
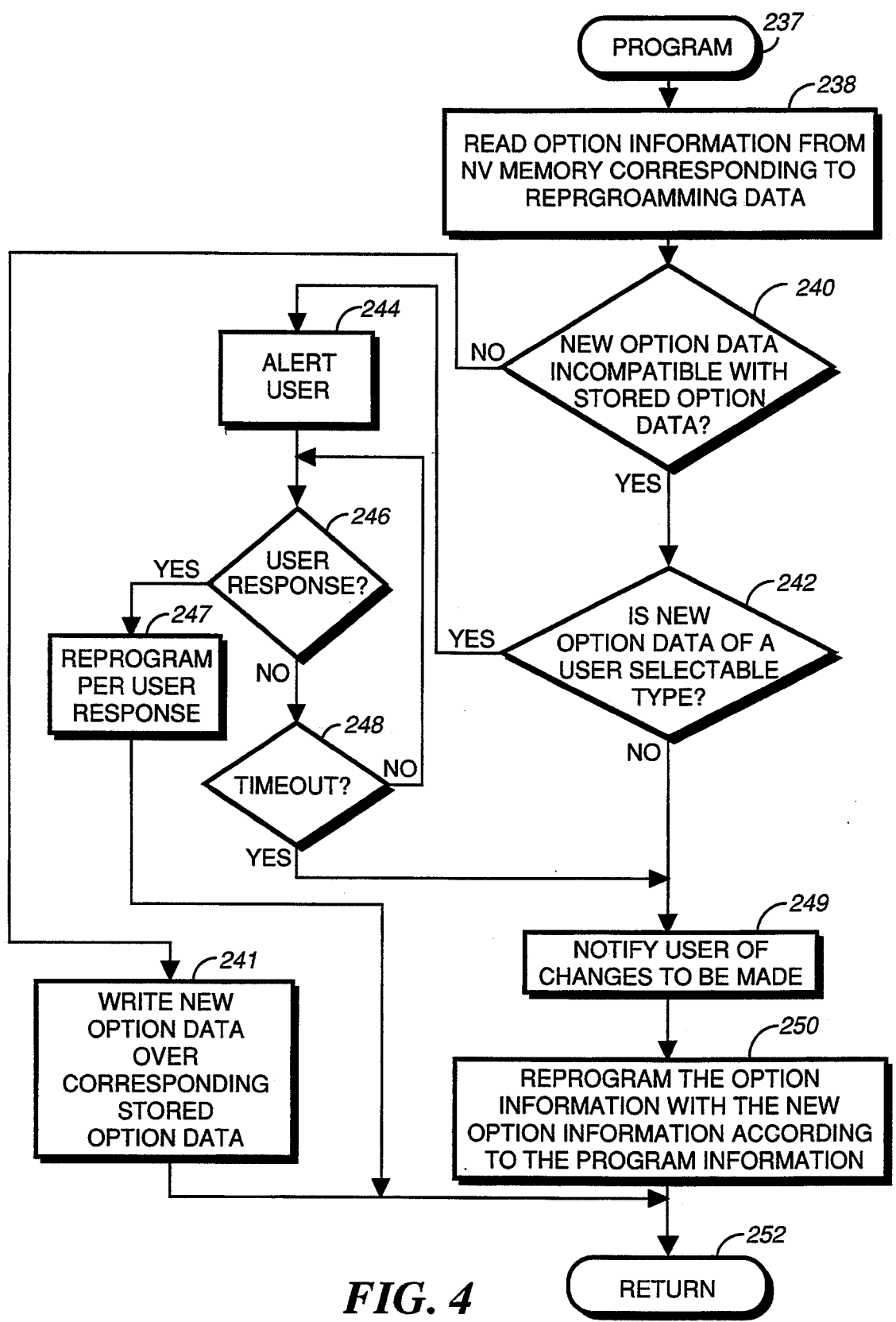
FIG. 4 is a flowchart of the operation of the reprogramming program received by the selective call receiver in accordance with a preferred embodiment of the present invention.

Referring next to FIG. 4, the operation of the reprogramming program 237 according to the preferred embodiment of the present invention is shown. To reprogram the options of features stored in the nonvolatile memory 70, first, the option information in the nonvolatile memory 70 (FIG. 1) corresponding to the reprogramming data is read 238 and it is determined by the processor running the program information whether the new option data is compatible or incompatible with the corresponding stored option data 240. If the new option data is compatible with the stored option data 240 then new option data is written over the corresponding stored option data 241 and processing returns 252 to look for the end-of-data (EOD) code 224 (FIG. 3B).

In accordance with another aspect of the present invention, if the new option data is incompatible with the stored option data 240 it is determined whether the new option data is of a user selectable type 242. If so, the user is alerted 244 and a timer is started. If the user responds 246 before the timer times out 248 by activating one of the user inputs 60 (FIG. 1), the option data will be reprogrammed 247 in accordance with the program information and in response to the user response. Processing will then return 252 and determine whether an end-of-data symbol (EOD) is received 224 (FIG. 3B). If the timer times out 248 without the user responding 246, the user is notified of the changes to be made 249 and the option information is reprogrammed with the new option information in accordance with the program information received 250. Likewise, user notification of the changes to be made 249 and intelligent reprogramming according to the program information 250 occurs if the new option data is not of a user selectable type 242. After intelligent reprogramming 250, processing returns 252 to search for the end-of-data symbol 224 (FIG. 3B).

Thus, the processor 34 (FIG. 1) can receive over-the-air information including program information and reprogramming data and reprogram the programmable nonvolatile memory 70 with the reprogramming data 112 according to the program information 110 (FIG. 2). Furthermore, the user is alerted 244 upon the occurrence of certain incompatibilities during the reprogramming and can input information 246 by activation of user input 60 to control the reprogramming.

Figure 5A:
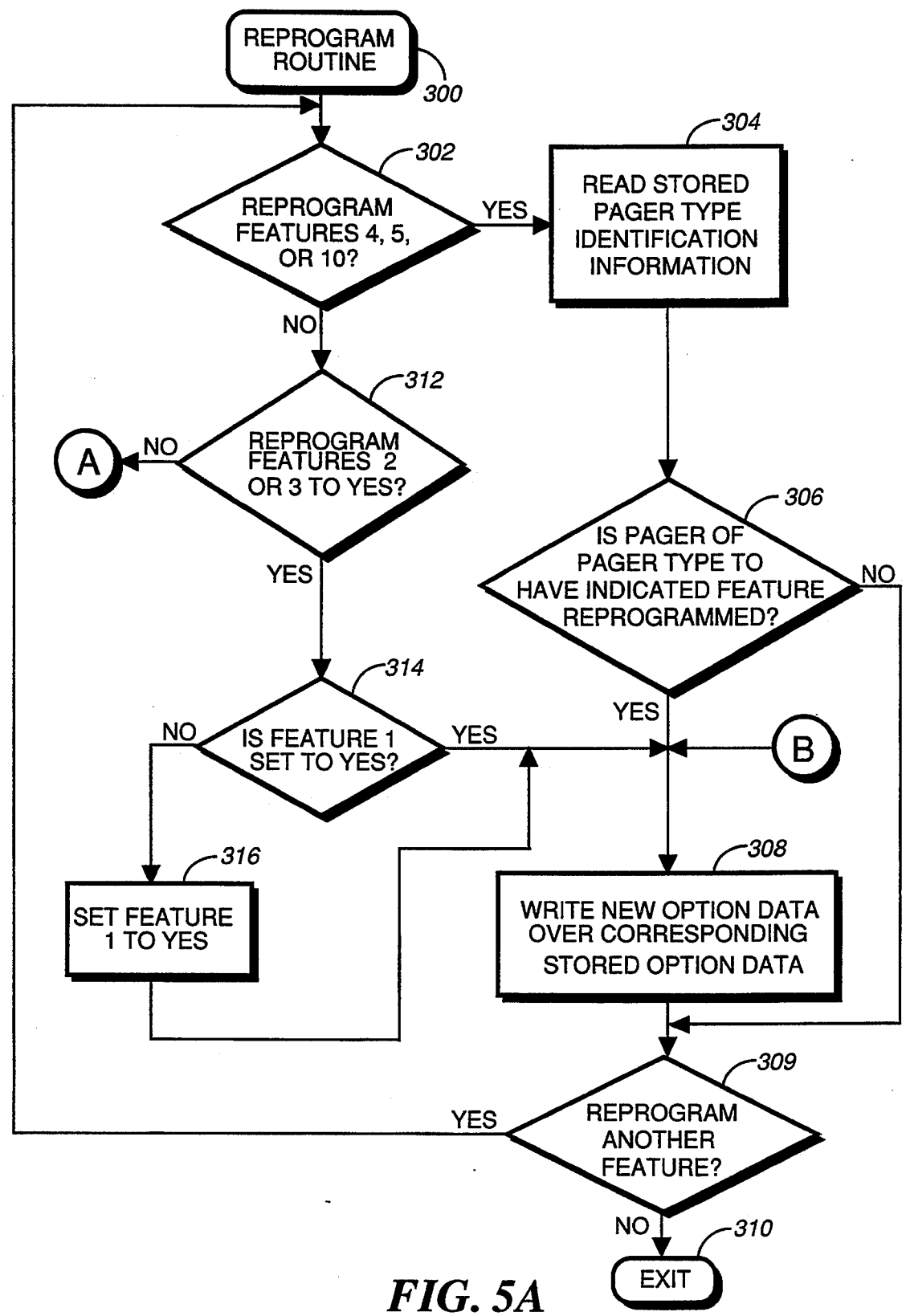
FIGS. 5A, 5B, and 5C are an exemplary flowchart of program information in accordance with the preferred embodiment of the present invention.
Figure 5B:
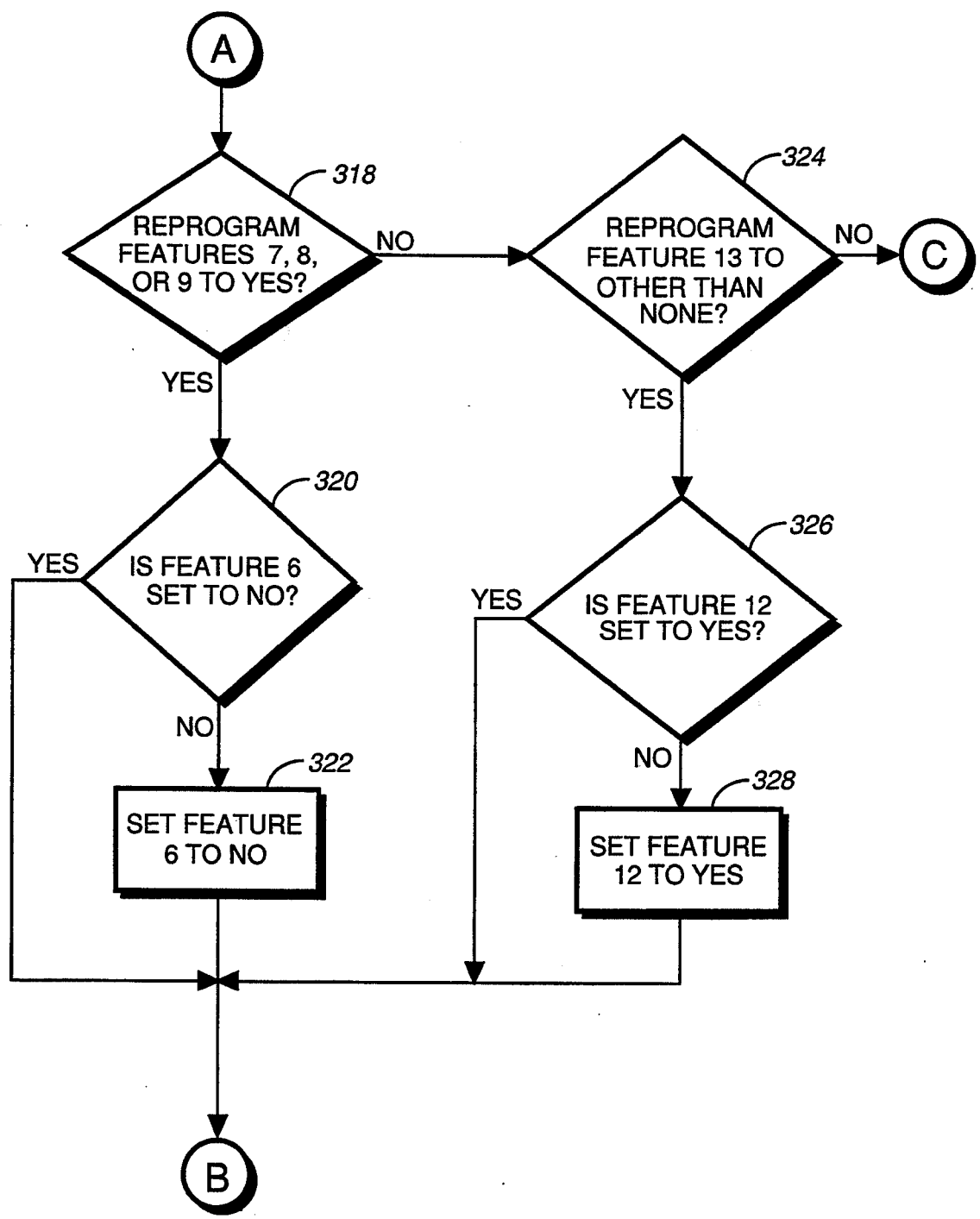
Figure 5C:
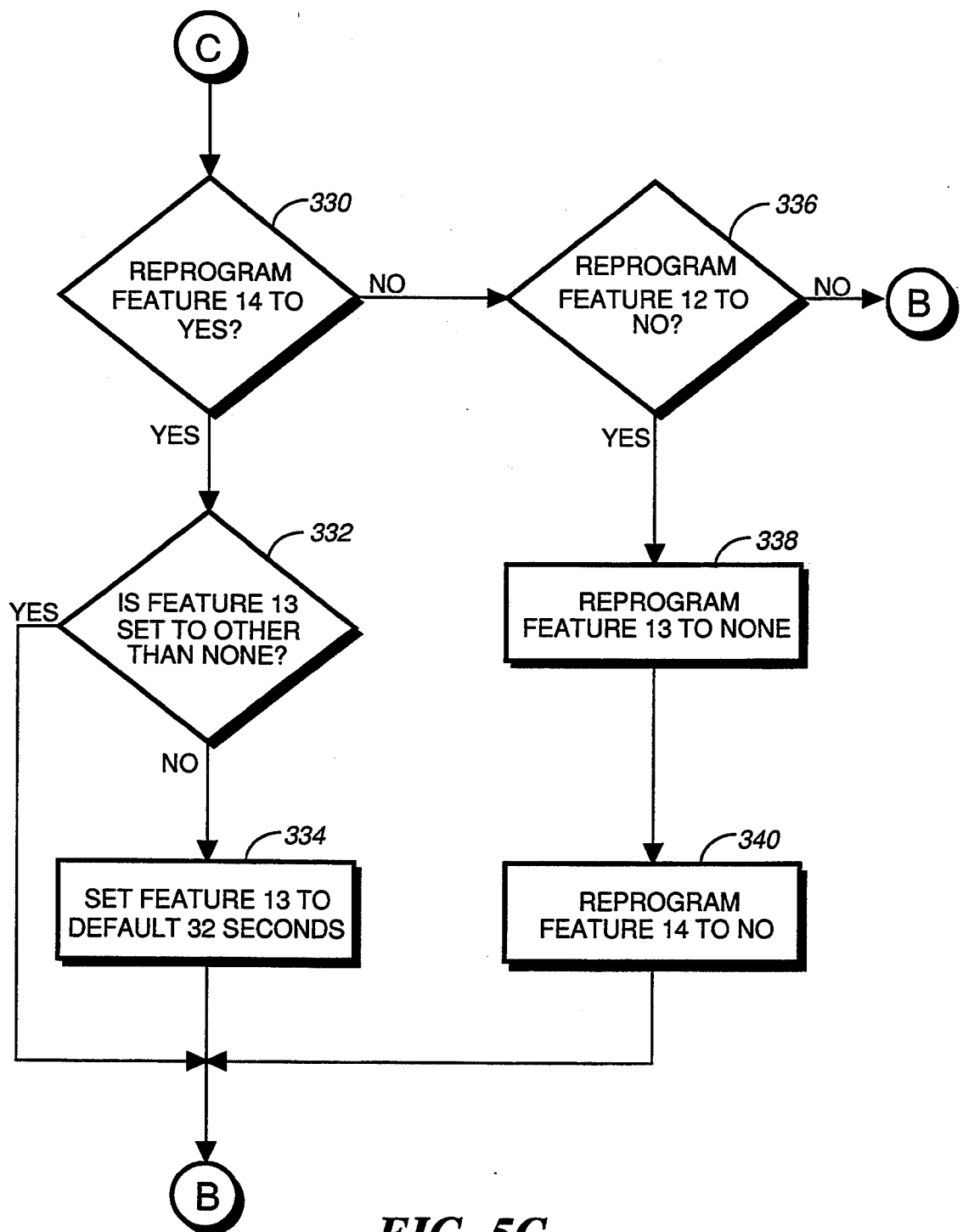

Referring next to FIGS. 5A, 5B, and 5C, a possible reprogramming sequence particularly applicable to intelligent over-the-air reprogramming is described. Certain features which have options determined by information stored in the programmable nonvolatile memory 70 (FIG. 1) are interrelated. Some of those features are shown in Table 1.

TABLE 1

| FEATURES | OPTIONS |
| --- | --- |
| (1) Retain Memory | Yes |
|  | No |
| (2) Memory Clean-up | Yes |
|  | No |
| (3) Save Maildrops | Yes |
|  | No |
| (4) Power Up Prompt | Yes |
|  | No |
| (5) Pager Disable Prompt | Yes |
|  | No |
| (6) Disable All Pager Alerts | Yes |
|  | No |
| (7) Reminder Alert | Yes |
|  | No |
| (8) Bell Character Chirp | Yes |
|  | No |
| (9) Audible Low Battery Alert | Yes |
|  | No |
| (10) Delete Slot Number | Yes |
|  | No |
| (11) Vibrator | Yes/On |
|  | No/Off |
| (12) Duplicate Message Detection | Yes |
|  | No |
| (13) Sequential Lockout Period | None |
|  | 16 sec. |
|  | 32 sec. |
|  | 64 sec. |
|  | 2 min. |
|  | 3 min. |
| (14) Alert After Lockout Period | Yes |
|  | No |

For example, the Memory Cleanup (2) feature and the Save Maildrops (3) feature cannot be activated to "Yes" unless the Retain Memory (1) feature has the "Yes" option activated. Likewise, the Disable All Pager Alert (6) feature must have the "No" option selected before the Reminder Alert (7), the Bell Character Chirp (8), or the Audible Low Battery Alert (9) features can be selected to the option "Yes". Also, the Duplicate Message Detection (12), the Sequential Lockout Period (13), and the Alert After Lockout Period (14) features are a related group. The above described features are user selectable types of features.

Non-user selectable types of features include the Power-Up Prompt (4), the Pager Disable Prompt (5), and the Delete Slot Number (10) features. These features are only supported by certain types of pagers and therefore whether a user wishes them programmed or not, they cannot be reprogrammed if they are not supported by the pager circuitry.

Referring therefore to FIGS. 5A, 5B, and 5C, the operation of an exemplary reprogramming program 250 (FIG. 4) received by the selective call receiver for reprogramming the features shown in Table 1 begins 300 and examines the reprogramming data to determine which features are to be reprogrammed 302, 312, 318, 324, 330, 336. Referring to the features described in Table 1, above, if the Power-up Prompt feature (4), the Pager Disable Prompt feature (5), or the Delete Slot Number feature (10) are to be reprogrammed 302, the pager type identification information stored in the nonvolatile memory 70 (FIG. 1) is read 304. These four features are only supported by certain types of pagers. If the pager being reprogrammed is of the pager type to have the feature indicated by the reprogramming data to be reprogrammed 306, the new option data (i.e., the reprogramming data) is written over the corresponding stored option data 308. If another feature is to have the options reprogrammed 309, processing returns to examine the next reprogramming data to determine which features are to be reprogrammed 302, 312, 318, 324, 330, 336. If no other feature is to have the options reprogrammed 309, the reprogramming routine is then exited 310.

If the pager is not of a type to support the feature indicated by the reprogramming data 306, processing determines whether another feature is to be reprogrammed 309 and examines the next reprogramming data to determine which features are to be reprogrammed 302, 312, 318, 324, 330, 336 or exits the reprogramming routine 310 without reprogramming the feature. These features which are only supported by particular pager types are not user selectable and therefore, the user has no input into the reprogramming of these features.

If the non-user selectable features are not to be reprogrammed 302, the reprogramming data is examined to determine if a first group of related features regarding memory are to be reprogrammed 312. The Memory Clean-up feature (2) and the Save Mail Drop feature (3) cannot be reprogrammed to "Yes" unless the Retain Memory feature (1) is set to "Yes". Therefore, if the Memory Clean-up (2) or Save Maildrops (3) features are to be reprogrammed to "Yes" 312, the Retain Memory (1) feature is examined 314 to determine if it is set to the option "Yes". If the Retain Memory (1) feature is set to "Yes" 314, the new option data is written over the corresponding stored option data 308 for the Memory Clean-up (2) and/or Save Maildrops (3) features and the next reprogramming data is examined 309, 302 or the reprogramming routine is exited 310.

If the Retain Memory (1) feature is not set to "Yes" 314, the Retain Memory (1) feature is next set 316 to the option "Yes" and the stored option data for the Memory Clean-up (2) and/or the Save Maildrops (3) features are reprogrammed in accordance with the new option data. The next reprogramming data is then examined 309, 302 or the reprogramming routine is exited 310. Decision steps 312 and 314 determine whether the new option data is incompatible with the stored option data as shown in decision step 240 (FIG. 4). Thus, in accordance with the preferred embodiment of the present invention, between decision step 314 and step 316 the user could be alerted 244 and reprogramming could take place per the user's response 247 (FIG. 4). Additionally, the user could be notified of the changes made 249 (FIG. 4), such as the Retain Memory (1) feature being set to the option "Yes" 316.

Likewise, the alert features including the Disable All Pager Alerts (6) feature, the Reminder Alert (7) feature, the Bell Character Chirp (8) feature, and the Audible Low Battery Alert (9) feature form a related group of features. If it is determined that the pager dependable features 302 or the memory related features 312 are not to be reprogrammed, the reprogramming data is examined to determine whether the reminder Alert (7) feature, the Bell Character Chirp (8) feature or the Audible Low Battery Alert (9) feature are to be set to the option "Yes" 318. If the alert features (Reminder Alert (7), Bell Character Chirp (8), Auto Low Battery Alert (9)) are to be activated (i.e., the feature is to be set to the option "Yes") 318, it is determined whether the Disable All Pager Alerts (6) feature is set to the option "No" 320. If the Disable All Pager Alerts (6) feature is set to "No" 320, reprogramming of the stored option data takes place in response to the new option data 308 and the reprogramming routine is continued with new data 309, 302 or is exited 310. If, on the other hand, the Dialable All Pager Alerts (6) feature is activated (i.e., the option "Yes" is selected) 320, the Disable All Pager Alerts (6) feature is set to the option "No" 322. Reprogramming then takes place in accordance with the reprogramming data 308 and the reprogramming routine continues to examine whether another feature is to be reprogrammed 309 as described above. The alert features are user selectable features. Therefore, as described above, the user would preferably be alerted 244 and allowed to respond 236 (FIG. 3). In addition, the user would preferably be notified of changes made 249 (FIG. 4) if the Disable All Pager Alert feature is reprogrammed to the option "No" 320 (FIG. 5).

Not all groups of related features may depend upon the selection of one particular feature. For example, the Duplicate Message Detection (12) feature, the Sequential Lock-out Period (13) feature, and the Alert After Lockout Period (14) feature are more intricately related. If the memory features, the alert features or the pager-type dependent features are not to be reprogrammed 302, 312, 318, and it is determined that the Sequential Lockout Period (13) feature is to be reprogrammed to a value other than "None" 324, the Duplicate Message Detection (12) feature is examined to determine if it is set to the option "Yes" 326. If so, reprogramming takes place 308 in response to the new option data, and the reprogramming routine is exited 310. If not, the Duplicate Message Detection (12) feature is set to the option "Yes" 328, and reprogramming takes place in accordance with the reprogramming data 308. The reprogramming routine is then exited 310 if no other features are to be reprogrammed 309, or additional reprogramming takes place 309, 302, 312, 318, 324, 330, 336, 308.

If the Sequential Lockout Period (13) feature is not to be reprogrammed for a period other than "None" 324, the reprogramming data is examined to see if the Alert After Lockout Period (14) feature is to be set to the option "Yes" 330. If the Alert After Lock-out Period (14) feature is to be activated 330, the Sequential Lockout Period (13) feature is examined to determine whether it is set to an optional period other than "None" 332. If the Lockout Period is "None" 332, it is then reset to a default Lockout Period 334—e.g., 32 seconds. Thus, when the Lockout Period is set to an option other than the option "None" 332, 334, reprogramming of the Alert After Lockout Period (14) feature to the option "Yes" is done by writing the new option data over the corresponding stored option data 308, after which the next reprogramming data is processed 309, 302, or the reprogramming routine is exited 309, 310.

Another relationship between the Duplicate Message Detection (12) feature, the Sequential Lockout Period (13) feature and the Alert After Lockout Period (14) feature is set if the Duplicate Message Detection (12) feature is set to the option "No", the Sequential Lockout Period (13) feature must be set to the option "None" and the Alert After Lockout Period (14) feature must be set to the option "No" Therefore, if the Duplicate Message Detection (12) feature is to be reprogrammed to the option "No" 336, the Sequential Lockout Period (13) feature is reprogrammed to the option "None" 338 and the Alert After Lockout Period (14) feature is reprogrammed to the option "No" 340. Reprogramming of the Duplicate Message Detection (12) feature can then take place 308 in response to the reprogramming data received.

The Message Detection and Lockout Period features are of a user selectable type and therefore the user may be alerted 244, reprogramming may take place in response to a user response 247 and the user may be notified of changes made without a user response 249 (FIG. 4) as described above.

Therefore, it can be seen that decision steps 302, 312, 318, 324, 330 and 336 (FIG. 5) determine incompatibilities on their "Yes" branches, corresponding to decision step 240 (FIG. 4). If none of the incompatibilities appear in response to the reprogramming data, reprogramming will take place by writing new option data over the corresponding stored option data 308 (corresponding to step 241 (FIG. 4)) and the reprogramming routine will be exited 310 (corresponding to step 252), unless additional reprogramming is to take place 309. Other reprogramming will occur in accordance with the program information as shown in FIGS. 5A, 5B, and 5C, corresponding to step 250 (FIG. 4).

Program information 110 (FIG. 2) according to the preferred embodiment of the present invention, as described in the flowchart of FIG. 5, can be sent or modified depending upon what features are to be reprogrammed. For example, if one of the alert features is to be reprogrammed, only those portions of the flowchart of FIG. 5 that deal with the alert features 300, 318, 320, 322, 308, and 310 would be sent as program information 110 (FIG. 2), conserving air time and decreasing processing time. Likewise, if multiple non-related features are to be reprogrammed, multiple branches of the flowchart of FIG. 5 can be sent as programmed information 110 (FIG. 2).

By now it should be appreciated that there has been provided a selective call receiver which can be intelligently reprogrammed over the air.

What is claimed is:

1. A selective call receiver comprising:
   receiving means for receiving selective call signals comprising reprogramming messages;
   decoding means coupled to said receiving means for decoding said reprogramming messages to produce data comprising program information and reprogramming data;
   reprogrammable memory means for storing option information; and
   control means coupled to said decoding meters and said memory means for loading said program information and thereafter executing said program information to reprogram said option information in response to said reprogramming data and according to said loaded program information.

2. The selective call receiver according to claim 1 wherein said reprogrammable memory means is a nonvolatile memory device.

3. The selective call receiver according to claim 1 further comprising a random access memory means coupled to said control means for temporarily storing said program information after decoding said program information and before loading said program information.

4. The selective call receiver according to claim 1 wherein the control means comprises:
   loading means for reading the program information and loading it as an executable program;
   reading means for reading said option information stored in said reprogrammable memory means, a portion of the option information corresponding to said reprogramming data;
   determining means for determining whether reprogramming said portion of said reprogrammable memory means with said reprogramming data would be incompatible with said option information; and
   writing means for overwriting said portion of said reprogrammable memory means in response to said reprogramming data if reprogramming said portion of said reprogrammable memory means with said reprogramming data would not be incompatible with said option information.

5. The selective call receiver according to claim 4 wherein the writing means further reprograms said reprogrammable memory means in response to said reprogramming data in accordance with said program information if reprogramming said reprogrammable memory means with said reprogramming data would be incompatible with said option information.

6. The selective call receiver according to claim 4 further comprising alerting means coupled to said control means for providing a perceptible alert to a user in response to said determining means determining that reprogramming said reprogrammable memory means with said reprogramming data would be incompatible with said option information.

7. The selective call receiver according to claim 5 further comprising user input means coupled to said control means for generating a user input signal and for providing said user input signal to said control means, and
   wherein said writing means selectably reprograms said reprogrammable memory means in response to said user input signal.

8. A method in a selective call receiver for reprogramming option information in a nonvolatile memory device, the selective call receiver comprising a processor and said nonvolatile memory device, the method comprising the steps of:
   (a) receiving selective call signals comprising a reprogramming message;
   (b) decoding said reprogramming message to produce program information and reprogramming data;
   (c) loading said processor with said program information;
   (d) reprogramming said nonvolatile memory device in response to said reprogramming data and in accordance with said program information loaded into and executed by said processor.

9. The method of claim 8 wherein said reprogramming data comprises at least one new option data and wherein step (d) of reprogramming in accordance with the loaded program information comprises the steps of:
   (e) reading the option information stored in said nonvolatile memory device, a portion of the option information corresponding to said at least one new option data;
   (f) determining whether reprogramming said portion of the option memory with said at least one new option data would be incompatible with the option information; and
   (g) overwriting said portion of the option memory in response to said at least one new option data if reprogramming said portion of the option memory with said at least one new option data would not be incompatible with the option information.

10. The method of claim 9 further comprising the step of (h) reprogramming said portion of the option memory in response to said at least one new option data in accordance with said program information as processed by said processor if reprogramming said portion of the option memory with said at least one new option data would be incompatible with the option information.

11. The method of claim 10 wherein said new option data can be of a first type or a second type, the method further comprising, before step (h), the steps of:
   (i) determining whether said new option data is of said first type or said second type; and
   (j) activating an alert if said option data is of said second type and if reprogramming said portion of the option memory with said at least one new option data would be incompatible with the option information.

12. The method of claim 11 further comprising the steps of:
   (k) receiving a user input; and
   (l) reprogramming said portion of the option memory in response to said user input and said at least one new option data in accordance with said program information as executed by said processor.

13. A method in a selective call receiver for restructuring a memory device having selective call messages stored therein, the selective call receiver comprising a processor and said memory device, the method comprising the steps of:
   (a) receiving selective call signals comprising a reprogramming message;
   (b) decoding said reprogramming message to produce program information and reprogramming data;
   (c) loading said processor with said program information;
   (d) restructuring said memory device in response to said reprogramming data and in accordance with said program information as loaded into and executed by said processor.

* * * * *

UNITED STATES PATENT AND TRADEMARK OFFICE
CERTIFICATE OF CORRECTION

PATENT NO. : 5,381,138

DATED : January 10, 1995

INVENTOR(S) : Mark T. Stair, et. al.

It is certified that error appears in the above-identified patent and that said Letters Patent is hereby corrected as shown below:

Column 9, line 10, after decoding delete "meters" and insert --means--.

Signed and Sealed this

Second Day of January, 1996

*Attest:*

BRUCE LEHMAN

*Attesting Officer*     Commissioner of Patents and Trademarks